US008276897B2

(12) United States Patent
Schneider

(10) Patent No.: US 8,276,897 B2
(45) Date of Patent: Oct. 2, 2012

(54) DEVICE FOR KEEPING PLASTIC FASTENING ELEMENTS AT THE READY

(75) Inventor: Michael Schneider, Lahnau (DE)

(73) Assignee: Newfrey LLC, Newark, DE (US)

( * ) Notice: Subject to any disclaimer, the term of this patent is extended or adjusted under 35 U.S.C. 154(b) by 1300 days.

(21) Appl. No.: 11/869,963

(22) Filed: Oct. 10, 2007

(65) Prior Publication Data

US 2008/0087525 A1 Apr. 17, 2008

(30) Foreign Application Priority Data

Oct. 11, 2006 (DE) ......................... 10 2006 048 475

(51) Int. Cl.
*B23Q 3/00* (2006.01)

(52) U.S. Cl. ............................. 269/900; 269/71; 81/434

(58) Field of Classification Search .................. 269/900, 269/71–75, 291, 909; 81/434, 433, 57.44
See application file for complete search history.

(56) References Cited

U.S. PATENT DOCUMENTS

| | | | | |
|---|---|---|---|---|
| 4,989,846 | A * | 2/1991 | Quinn | 269/54.5 |
| 5,296,082 | A * | 3/1994 | Kubo | 156/500 |
| 5,320,007 | A * | 6/1994 | Weirauch | 82/1.11 |
| 6,062,113 | A * | 5/2000 | Nakano et al. | 81/434 |
| 6,073,521 | A * | 6/2000 | Uno et al. | 81/57.44 |
| 6,452,497 | B1 | 9/2002 | Finlayson | |
| 6,813,977 | B2 * | 11/2004 | Goodhue et al. | 81/433 |
| 7,581,722 | B2 * | 9/2009 | Garry et al. | 269/296 |
| 2004/0051221 | A1 * | 3/2004 | Sunadome | 269/47 |
| 2008/0087525 | A1 * | 4/2008 | Schneider | 198/618 |

FOREIGN PATENT DOCUMENTS

| | | | |
|---|---|---|---|
| EP | 0543748 | A1 | 5/1993 |
| FR | 2871035 | A | 12/2005 |
| GB | 2142375 | A | 1/1985 |

* cited by examiner

*Primary Examiner* — Lee D Wilson
(74) *Attorney, Agent, or Firm* — Michael P. Leary

(57) ABSTRACT

Plastic parts are held by a holding device in a position for transfer to a receiver. Each part has a wall with a pierceable wall region that is accessible from one side, and the holding device is provided with a needle. With the part in the transfer position, the pierceable wall region is pressed against the needle, so that the needle penetrates the pierceable wall region and the wall is secured to the needle. The holding device may be a magazine type with multiple sockets for holding corresponding parts on needles.

8 Claims, 2 Drawing Sheets

DEVICE FOR KEEPING PLASTIC FASTENING ELEMENTS AT THE READY

CROSS-REFERENCE TO RELATED APPLICATION

This application claims the benefit of German Patent Application No. 10 2006 048475.4 filed Oct. 11, 2006, incorporated herein by reference.

BACKGROUND OF THE INVENTION

This invention relates to a method and apparatus for holding parts such as plastic elements in a position for transfer to a receiver, such as a tool that uses the parts. The invention also relates to parts constructed for use in such method and apparatus.

Plastic fastening elements are frequently used in vehicles to attach cables, conduits, paneling elements, or the like to parts of the vehicle. In this connection, it is frequently desirable for the fastening elements to be installed in an automated fashion, for example with the aid of a robot. For automated installation, it is necessary to place a fastening element at the ready in a definite transfer position in which it can be grasped by the installation tool of the robot so that it can then be installed in the required fashion. In other cases, it can also be necessary to keep the fastening element at the ready in an assembly or installation tool, so that by actuating the tool, the assembly or installation can be executed. Plastic fastening elements are embodied in a wide variety of forms, so that keeping the various fastening elements at the ready is often difficult and requires a variety of holding devices. In addition, it is sometimes a challenge to design the fastening elements so that they can be held and secured by the available holding devices.

BRIEF DESCRIPTION OF THE INVENTION

An object of the invention is to provide a method and an apparatus for holding parts such as plastic fastening elements at the ready, more particularly for holding uniquely constructed parts at a transfer position, where the parts can be delivered to a receiver, such as a tool.

Parts utilized in the invention have a wall with one or more pierceable wall regions, and a holding device for the parts has one or more needles. With a part in a predetermined position, a pierceable wall region is pressed against a needle, so that the needle penetrates the pierceable wall region, and the wall is secured to the needle.

In an embodiment of the invention, a holding device is in the form of a magazine with multiple sockets provided with needles, each socket holding a corresponding part. A slider pushes a part situated in front of the slider off the needles of the socket, so that the part is transferred to a receiver.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 1:
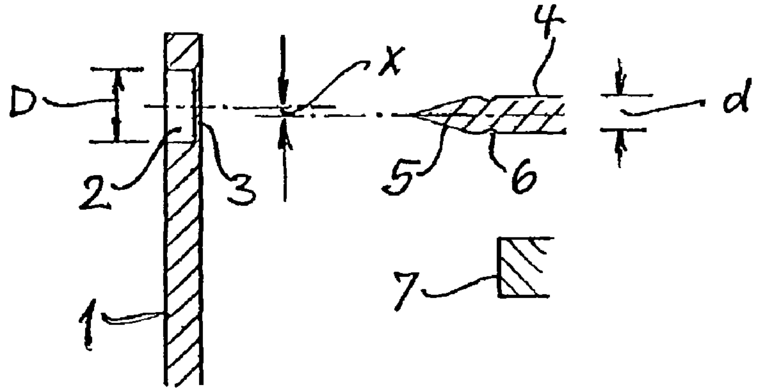
FIG. 1 shows a pierceable wall region of a plastic element and a needle intended for piercing the wall region.

FIG. 1 shows a section of a wall 1 of a plastic fastening element in one embodiment of the invention. In the vicinity of its edge, the wall 1 is provided with a recess 2 that forms a wall region 3 with a significantly thinner wall thickness. The thickness of the wall region 3 is dimensioned so that the wall region 3 can be pierced by a sharp needle 4 without exerting a large amount of force. The needle 4 is part of a holding device that serves to keep the fastening element at the ready for transfer to a receiver, such as a tool for automatic installation or assembly of the fastening element. At its free end, the needle 4 has a tip 5 and, spaced apart from the tip, has a holding recess in the form of an annular groove 6, or a notch or undercut.

In the embodiment, the recess 2 is round and has a diameter D. Alternatively to this, however, the recess can also be embodied in an oval or polygonal form. The needle has a diameter d, which is considerably smaller than the diameter D of the recess. This diameter difference means that the center of the recess can have an offset x in relation to the central axis of the needle 4, which corresponds to half of the difference of the diameters D minus d, without hindering the insertion of the needle 4 into the wall region 3 and without causing constraining forces to act on the needle in a transverse direction. The embodiment of the wall region 3 in relation to the needle 4 consequently permits a fastening of the wall 1 through insertion of the needle 4 into the wall region 3, even when the fastening element with the wall 1 is not exactly aligned in relation to the needle 4, but when the needle 4 is inserted in a region that is offset from the needle 4 by an amount determined by the diameters D, d. Thus, manufacturing tolerances are accommodated.

In order to secure the wall 1, it is pressed with its pierceable wall region 3 against the sharp end of the needle 4. The needle 4 penetrates the wall region 3 and elastically and plastically deforms it while forming a hole. In the position of the wall 1 achieved by a stop 7 of the holding device adjacent to the needle 4, the edge of the opening, which is pierced by the needle 4 and encompasses the needle 4 in an elastic fashion, engages in the material of the annular groove 6, fixing the wall 1 on the needle 4 in a fashion suitable for temporarily holding it.

Figure 2:
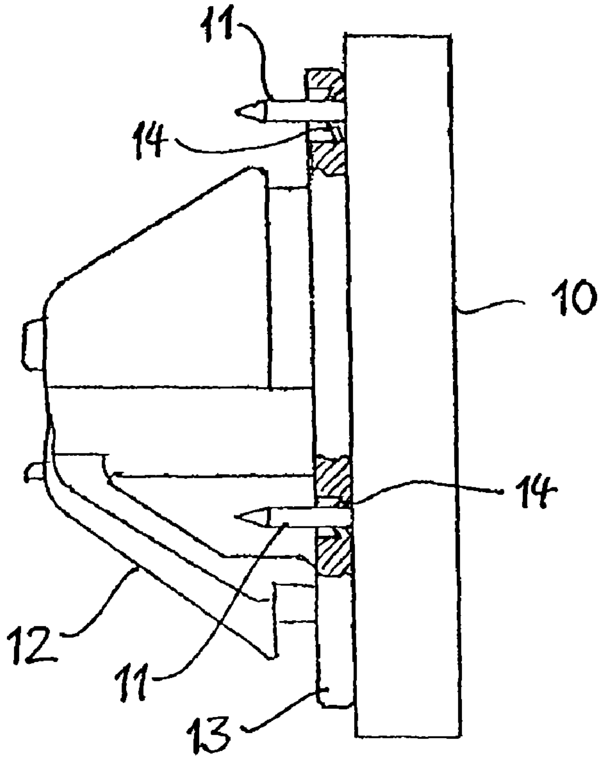
FIG. 2 shows a holding device according to the invention, with a plastic element held by it.

A single needle can sometimes be sufficient to hold a part if the part is small and additional supports can be provided on the holding device. In many cases, however, it is suitable to fix a part with several needles at several points. FIG. 2 shows one such example. A plate-shaped holding device 10 is provided with three needles 11 spaced uniformly apart from one another, only two of which are visible in the drawing. The needles hold a fastening element 12, which is designed to be fastened in a circular opening in sheet metal. The fastening element 12 has an annular flange 13, which has thin-walled, pierceable wall regions 14 spaced the same distance apart as the needles 11. Oriented so that the wall regions 14 are situated in front of the needles 11, the fastening element 12 is pressed against the holding device 10. As a result, the needles 11 pierce the wall regions 14 as shown, forming openings whose edges adhere to the outside surface of the needles 11 in a frictionally engaging fashion (with or without needle recesses). The contact of the fastening element 12 against the holding device 10 defines the final position in the axial direction of the needles 11. The fastening element 12 is thus placed in readiness in a position in relation to the holding device, which position is defined in all three spatial directions in relation to the holding device, so that a subsequent assembly procedure can start from this position.

Figure 3:
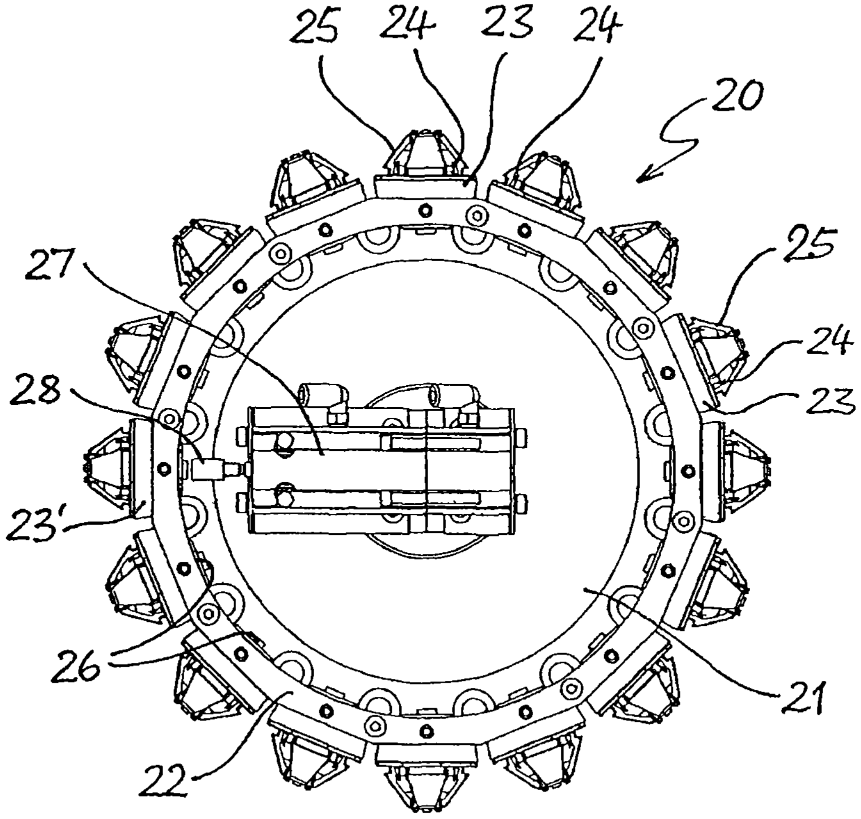
FIG. 3 is a view of a round magazine with plastic elements held by it.

FIG. 3 shows a round magazine 20, which is composed of a rotatable disk 21 and an annular holding device 22 situated on the rim of the disk 21. The holding device 22 is coaxial to the rotation axis of the round magazine 20 and on its outside has a multitude of sockets 23 spaced uniformly circumferentially. Each socket 23 is provided with several parallel needles 24 that project outward, each set of which holds a respective fastening element 25 in the above-described manner. In the center of each socket, the annular holding device 22 is provided with a through bore 26. On the inside of the holding device 22 is situated an actuator 27, which is equipped with a radially mobile slider 28 that is aligned with a through bore in the depicted position of the round magazine 20 and, when the actuator 27 is triggered, can move outward through the through bore 26. The socket 23' in front of the slider 28 is situated at a position provided for transferring a fastening element 25 to a receiver such as an assembly tool. If such a tool is situated on the outside, in front of the socket 23', ready for transfer of the fastening element 25, then the actuator 27 is triggered and the slider 28 pushes the fastening element 25 off of the needles and toward the assembly tool. This simplifies the transfer, so that the assembly tool does not have to be brought snugly against the round magazine 20.

After the fastening element is transferred, a stepper motor (not shown) rotates the round magazine 20 by a fraction predetermined by the spacing of the through bores so that the slider can transfer the next fastening element.

Figure 4:
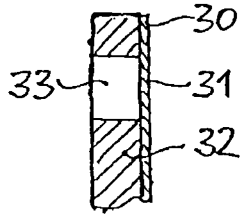
FIG. 4 shows a pierceable wall region comprised of a film.

FIG. 4 shows a section through a pierceable wall region 31 composed of a film 30 on a wall 32 of a fastening element. The film covers an opening 33 in the wall 32 and, after the manufacture of the fastening element, can be welded to the wall or stuck to the wall in the form of a self-adhesive film.

Figure 5:
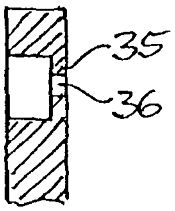
FIG. 5 shows a perforated pierceable wall region.

If it is not possible to manufacture the pierceable wall region with a thin enough film, then it is possible, as shown in FIG. 5, for the pierceable wall region 35 to be perforated with a hole 36. The diameter of this hole 36, however, must be smaller than the diameter of the needle.

Figure 6:
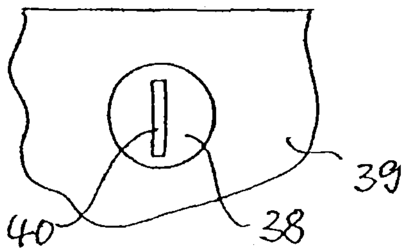
FIG. 6 shows a slit pierceable wall region.

FIG. 6 shows a variant in which the pierceable wall region 38 of a wall 39 is provided with a slit 40. The width of the slit 40, too, must be smaller than the diameter of the needle.

The above-described method, and the apparatus described for executing it are suitable not only for plastic fastening elements, but also for a wide variety of parts that must be kept in readiness for processing steps or between such processing steps. The invention is particularly advantageous when the outer form of the parts does not provide any suitable engagement surfaces for holding mechanisms.

While preferred embodiments of the invention have been shown and described, it will be apparent that changes can be made without departing from the principles and spirit of the invention, the scope of which is defined in the accompanying claims. For example, a multi-socket magazine may be rod-shaped, rather than round, with needles of adjacent sockets projecting in the same direction from one side of the magazine, and with the slider arranged at the opposite side of the magazine and adjustable along the length of the magazine to different positions at which the slider can eject corresponding parts from the magazine.

What is claimed is:

1. An apparatus for holding parts, having a pierceable wall region, in a position for transfer to a receiver, the apparatus for holding parts comprising: a holding device in the form of a round magazine rotatable about a central axis and including a plurality of sockets, each socket having at least one fixed projecting needle for piercing the pierceable wall region of a part and thereby securing the part on the holding device, and the sockets are spaced uniformly about the circumference of the magazine with the needles projecting outwardly away from the central axis.

2. An apparatus according to claim 1, wherein the magazine is annular, and a radially moveable slider is disposed between the central axis and the annular magazine to push a part situated in alignment with the slider off of each needle of a corresponding socket.

3. An apparatus according to claim 1, wherein each needle has a holding recess to engage material of a pierced wall region.

4. An apparatus for presenting a fastener in a readiness condition to an assembly tool for the start of an assembly procedure, the fastener including a flange portion and defining an axis, the apparatus comprising:

a holding device including a fixed projecting needle, the needle substantially parallel to the fastener axis and able to pierce the flange portion of the fastener and support the fastener on the holding device in the readiness condition, wherein the holding device constituting a first holding device and the apparatus for presenting a fastener further includes at least one second holding device, and the first holding device and the at least one second holding device are arranged as a magazine operable for holding multiple fasteners and movable from a first position, wherein the first holding device is presented to the assembly tool, to a second position, wherein the at least one second holding device is presented to the assembly tool.

5. An apparatus for presenting a fastener according to claim 4, wherein the needle constitutes a first needle and the holding device includes at least one second needle.

6. An apparatus for presenting a fastener according to claim 4, wherein the needle includes a tip and a shank, and the shank defines an annular groove for engaging the surrounding material of the pierced fastener.

7. An apparatus for presenting a fastener according to claim 4, wherein the magazine is annular, and the first holding device and the at least one second holding device are arranged circumferentially around the annular magazine with the respective needles pointing radially outward, and the annular magazine is rotatable from the first position to the second position.

8. An apparatus for presenting a fastener according to claim 4, wherein the first holding device and the at least one second holding device each include a first side, from which the respective needles project, and a second side opposite to the first side, and each holding device defines a respective through bore from the first side to the second side, and the apparatus further includes an actuator, and when in the first position the actuator is operable to move from the second side through the bore and push a fastener off the needle of the first holding device and toward the assembly tool proximate to the first side.

* * * * *